US011369052B2

(12) United States Patent
Cozza et al.

(10) Patent No.: US 11,369,052 B2
(45) Date of Patent: Jun. 28, 2022

(54) SYSTEM AND METHOD FOR MONITORING PLUGGING OF BASKET ASSEMBLIES OF AN AGRICULTURAL IMPLEMENT

(71) Applicant: CNH Industrial America LLC, New Holland, PA (US)

(72) Inventors: Michael R. Cozza, Pittsburgh, PA (US); Scott Glovier, Pittsburgh, PA (US); Raul Espinosa, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 502 days.

(21) Appl. No.: 16/541,319

(22) Filed: Aug. 15, 2019

(65) Prior Publication Data

US 2021/0045274 A1    Feb. 18, 2021

(51) Int. Cl.
| | | |
|---|---|---|
| *A01B 29/04* | (2006.01) | |
| *A01B 29/06* | (2006.01) | |
| *A01B 49/02* | (2006.01) | |
| *A01B 71/08* | (2006.01) | |

(52) U.S. Cl.
CPC ............ *A01B 29/06* (2013.01); *A01B 29/048* (2013.01); *A01B 49/022* (2013.01); *A01B 71/08* (2013.01)

(58) Field of Classification Search
CPC ..... A01B 29/048; A01B 29/06; A01B 49/027; A01B 71/08
See application file for complete search history.

(56) References Cited

U.S. PATENT DOCUMENTS

| | | |
|---|---|---|
| 3,863,428 A | 2/1975 | Baxter |
| 4,286,424 A | 9/1981 | Hubbard |
| 5,063,729 A | 11/1991 | Fox et al. |
| 5,425,223 A | 6/1995 | Delaronde |
| 6,397,569 B1 | 6/2002 | Homburg et al. |
| 6,438,506 B1 | 8/2002 | Yohpe et al. |

(Continued)

FOREIGN PATENT DOCUMENTS

| | | |
|---|---|---|
| EP | 1630574 B1 | 7/2013 |
| EP | 3400763 A1 | 11/2018 |

OTHER PUBLICATIONS

The International Search Report and Written Opinion Corresponding to Application No. PCT/US2020/046051 dated Nov. 30, 2020 (11 pages).

(Continued)

*Primary Examiner* — Gary S Hartmann
(74) *Attorney, Agent, or Firm* — Rebecca L. Henkel; Rickard K. DeMille

(57) ABSTRACT

A system for monitoring basket plugging for agricultural implements includes a basket assembly configured to be supported by an agricultural implement and a range sensor positioned relative to the basket assembly such that the range sensor is configured to transmit detection signals towards an interior of the basket assembly and receive return signals based on reflection of the detection signals off at least one surface. The system also includes a controller communicatively coupled to the range sensor. The controller is configured to analyze data received from the range sensor as the basket assembly rotates relative to the range sensor to determine when the basket assembly is experiencing a plugged condition.

20 Claims, 7 Drawing Sheets

(56) References Cited

U.S. PATENT DOCUMENTS

| | | |
|---|---|---|
| 6,956,348 B2 | 10/2005 | Landry et al. |
| 6,990,390 B2 | 1/2006 | Groth et al. |
| 7,143,836 B2 | 12/2006 | Dietrich, Sr. |
| 7,354,341 B1 | 4/2008 | Smith et al. |
| 8,326,500 B2 | 12/2012 | Mariman et al. |
| 8,408,149 B2 | 4/2013 | Rylander |
| 8,928,486 B2 | 1/2015 | Hui et al. |
| 9,405,039 B2 | 8/2016 | Anderson |
| 9,485,900 B2 | 11/2016 | Connell et al. |
| 10,151,839 B2 | 12/2018 | McPeek |
| 10,194,573 B2 | 2/2019 | Steinlage et al. |
| 10,255,670 B1 | 4/2019 | Wu et al. |
| 11,058,045 B2 * | 7/2021 | Harmon ............... A01B 79/005 |
| 11,191,202 B2 * | 12/2021 | Henry .................... A01B 33/12 |
| 11,202,402 B2 * | 12/2021 | Glovier ................ G07C 5/0816 |
| 11,234,355 B2 * | 2/2022 | Smith ................... A01B 63/111 |
| 2012/0291680 A1 | 11/2012 | Rylander |
| 2014/0209337 A1 | 7/2014 | Westlind |
| 2016/0088787 A1 | 3/2016 | Connell et al. |
| 2017/0359940 A1 | 12/2017 | Bassett |
| 2018/0139884 A1 | 5/2018 | Karsten et al. |
| 2018/0206393 A1 | 7/2018 | Stoller et al. |
| 2018/0321386 A1 | 11/2018 | Bosetti et al. |
| 2018/0364128 A1 | 12/2018 | Stovall et al. |
| 2021/0029865 A1 * | 2/2021 | Smith ................. A01B 63/1115 |
| 2021/0105942 A1 * | 4/2021 | Paxinos ............... A01B 49/027 |

OTHER PUBLICATIONS

Conesa-Muñoz et al.; "Distributed Multi-Level Supervision to Effectively Monitor the Operations of a Fleet of Autonomous Vehicles in Agricultural Tasks"; *Sensors* 2015, 15, 5402-5428; doi:10.3390/s150305402; ISSN 1424-8220; Centre for Automation and Robotics, (CSIC-UPM), Arganda del Rey, 28500 Madrid, Spain; dated Mar. 5, 2015 (27 pages).

* cited by examiner

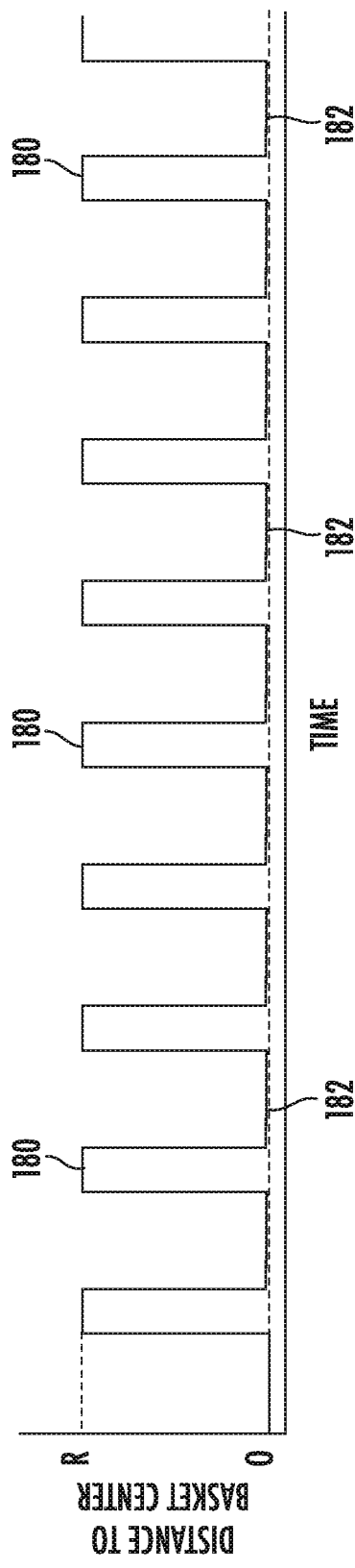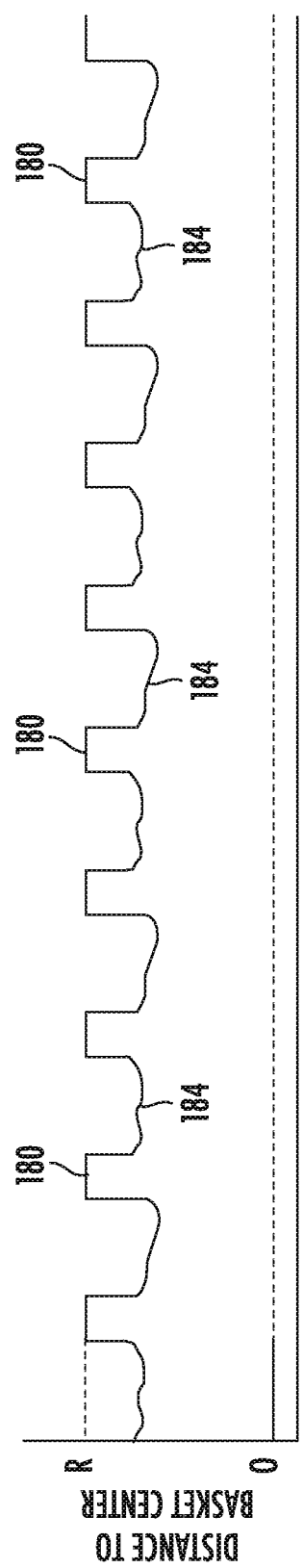

SYSTEM AND METHOD FOR MONITORING PLUGGING OF BASKET ASSEMBLIES OF AN AGRICULTURAL IMPLEMENT

FIELD OF THE INVENTION

The present disclosure generally relates to agricultural implements and, more particularly, to systems and methods for monitoring plugging of rolling basket assemblies of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow discs, leveling discs, rolling baskets, shanks, tines, and/or the like. Such ground engaging tool(s) loosen, agitate, and/or otherwise work the soil to prepare the field for subsequent planting operations.

During tillage operations, field materials, such as residue, soil, rocks, mud, and/or the like, may become trapped or otherwise accumulate on and/or within ground engaging tools or between adjacent ground engaging tools. For instance, material accumulation will often occur around the exterior of a basket assembly (e.g., on the blades or bars of the basket assembly) and/or within the interior of the basket assembly. Such accumulation of field materials may prevent the basket assembly from performing in a desired manner during the performance of a tillage operation. In such instances, it is often necessary for the operator to take certain corrective actions to remove the material accumulation. However, it is typically difficult for the operator to detect or determine a plugged condition of a basket assembly when viewing the tools from the operator's cab.

Accordingly, an improved system and method for monitoring plugging of basket assemblies of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring basket plugging for agricultural implements. The system includes a basket assembly configured to be supported by an agricultural implement and a range sensor positioned relative to the basket assembly such that the range sensor is configured to transmit detection signals towards an interior of the basket assembly and receive return signals based on reflection of the detection signals off at least one surface. The system also includes a controller communicatively coupled to the range sensor. The controller is configured to analyze data received from the range sensor as the basket assembly rotates relative to the range sensor to determine when the basket assembly is experiencing a plugged condition.

In another aspect, the present subject matter is directed to an agricultural implement that includes a frame, a basket assembly configured to be supported by the frame, and a range sensor supported relative to the basket assembly such that the range sensor has a line of detection directed towards an interior of the basket assembly. The range sensor configured to generate data associated a distance between the range sensor and at least one surface aligned with the line of detection as the basket assembly is rotated relative to the range. The implement further includes a controller communicatively coupled to the range sensor. The controller is configured to analyze the data received from the range sensor to determine when the basket assembly is experiencing a plugged condition.

In a further aspect, the present subject matter is directed to a method for monitoring plugging of basket assemblies of agricultural implements. The method includes transmitting, with a range sensor, detection signals towards an interior of a basket assembly of an agricultural implement as the basket assembly is rotating, and receiving return signals based on reflection of the detection signals off at least one surface. In addition, the method includes analyzing, with a computing device, data associated at least in part with the return signals to determine when the basket assembly is experiencing a plugged condition.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates an exemplary plot showing an example data trace or profile associated with the sensor data collected by a range sensor of the disclosed system when a basket assembly is in a non-plugged state in accordance with aspects of the present subject matter;

FIG. 7 illustrates an exemplary plot showing an example data trace or profile associated with the sensor data collected by a range sensor of the disclosed system when a basket assembly is in a plugged state in accordance with aspects of the present subject matter;

Figure 1:
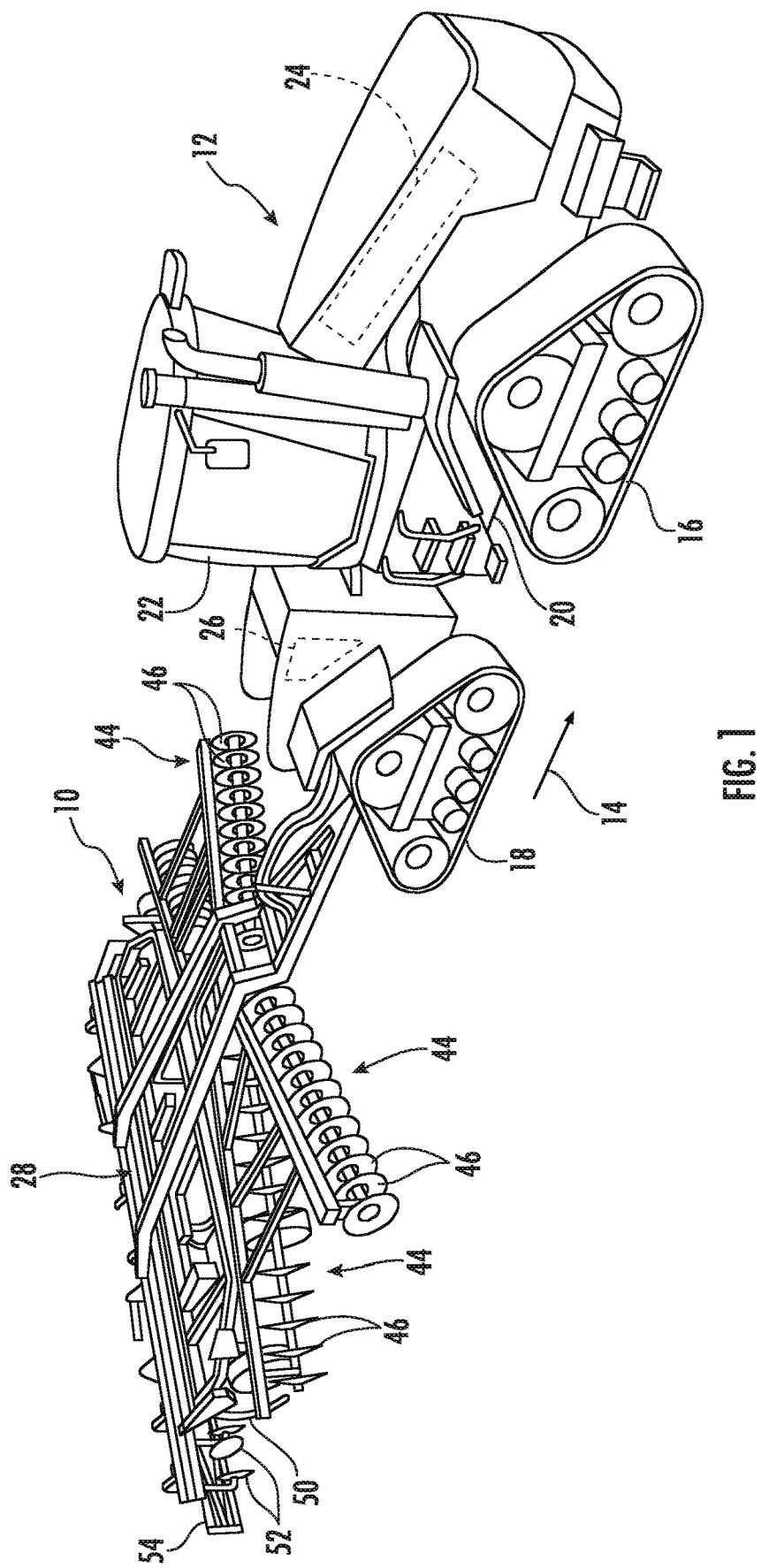
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring plugging of one or more basket assemblies of an agricultural implement. Specifically, in several embodiments, the disclosed system may include one or more range sensors supported relative to a given basket assembly such that each range sensor is configured to transmit detection signals towards an interior of the basket assembly. In addition, each range sensor may be configured to detect return signals corresponding to the detection signals as reflected off a detected surface(s). By analyzing the return signals received by each range sensor (or the lack thereof) and/or any data associated with the signals, a controller or computing device of the system may infer or determine that the corresponding basket assembly is currently plugged or experiencing a plugged condition. For instance, in one embodiment, the controller may be configured to assess the data trace or profile of the sensor data received from each range sensor to identify the existence of material accumulation on and/or within the basket assembly. Once it is determined that the basket assembly is experiencing a plugged condition, an appropriate control action may then be executed, such as by notifying the operator of the plugged condition or by performing an automated control action.

Figure 2:
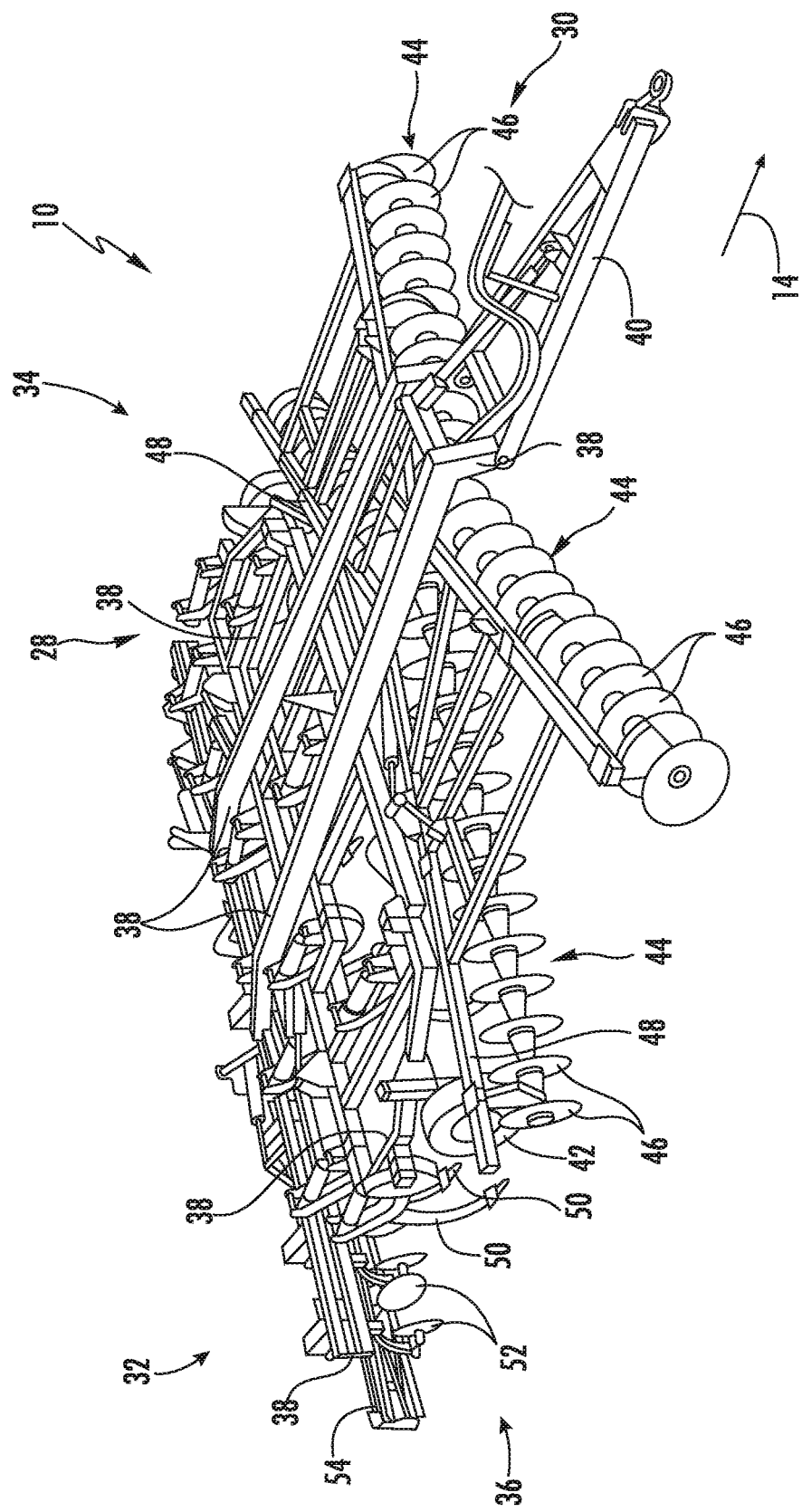
FIG. 2 illustrates another perspective view of the agricultural implement shown in FIG. 1 in accordance with aspects of the present subject matter.

Referring now to the drawings. FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support various ground engaging tools. For instance, the frame 28 may support one or more gangs or sets 44 of disc blades 46. Each disc blade 46 may be configured to penetrate into or otherwise engage the soil as the implement 10 is being pulled through the field. In this regard, the various disc gangs 44 may be oriented at an angle relative to the direction of travel 14 to promote more effective tilling of the soil. In the embodiment shown in FIGS. 1 and 2, the implement 10 includes four disc gangs 44 supported on the frame 28 adjacent to its forward end 30. However, it should be appreciated that, in alternative embodiments, the implement 10 may include any other suitable number of disc gangs 44, such as more or fewer than four disc gangs 44. Furthermore, in one embodiment, the disc gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support one or more finishing tools, such as a plurality of leveling blades 52 and/or rolling (or crumbler) basket assemblies 54. However, in other embodiments, any other suitable ground-engaging tools may be coupled to and supported by the implement frame 28, such as a plurality of closing discs.

Figure 3:
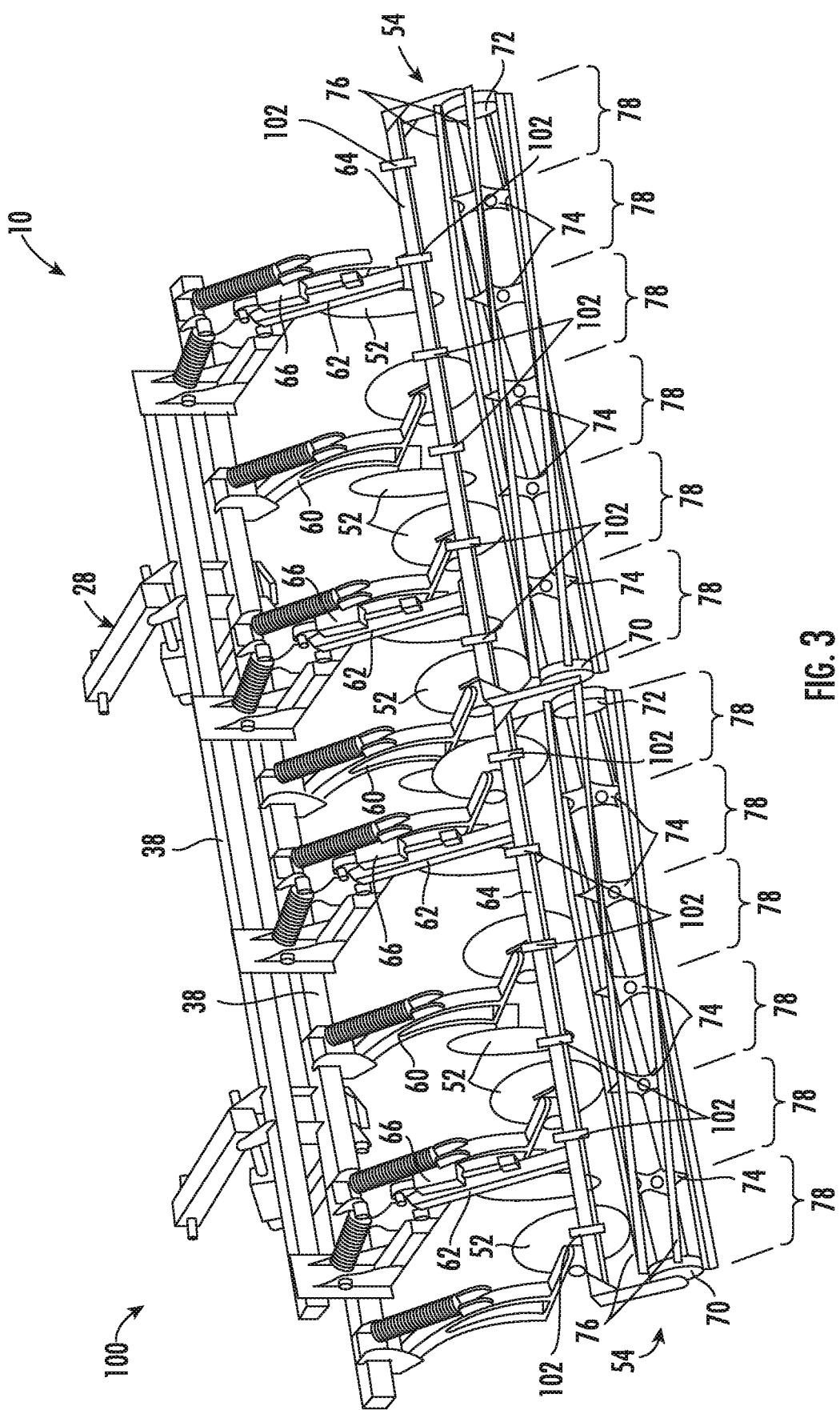
FIG. 3 illustrates a partial perspective view of basket assemblies positioned at an aft end of the implement shown in FIGS. 1 and 2, particularly illustrating one embodiment of a system for monitoring plugging of the basket assemblies in accordance with aspects of the present subject matter.

Referring now to FIG. 3, a partial, perspective view of the aft end of the implement 10 shown in FIGS. 1 and 2 is illustrated in accordance with aspects of the present subject matter, particularly illustrating a portion of the finishing tools 52, 54 of the implement 10. As shown, the various finishing tools 52, 54 may be coupled to or supported by the implement frame 28, such as by coupling each tool to a toolbar or laterally extending flame member 38 of the frame 28. For instance, as shown in FIG. 3, a blade support arm 60 may be coupled between a given frame member 38 and each leveling blade 52 or set of leveling blades 52 to support the blades 52 relative to the frame 28. Similarly, one or more basket support arms 62 may be coupled between a given frame member 38 and an associated mounting yoke or basket hanger 64 for supporting each basket assembly 54 relative to the frame 28. Additionally, as shown in FIG. 3, in one embodiment, a basket actuator 66 (e.g., a hydraulic or pneumatic cylinder) may be coupled to each basket support arm 62 to allow the down force or down pressure applied to each basket assembly 54 to be adjusted. The basket actuators 66 may also allow the basket assemblies 54 to be raised off the ground, such as when the implement 10 is making a headland turn and/or when the implement 10 is being operated within its transport mode.

In several embodiments, each basket assembly 54 includes a plurality of support plates 70, 72, 74 configured to support a plurality of blades or bars 76 spaced circumferentially about the outer perimeter of the basket. For instance, as shown in FIG. 3, each basket assembly 54 includes first and second end plates 70, 72 positioned at the opposed lateral ends of the basket assembly 54 and a plurality of inner support plates 74 spaced apart laterally from one another between the end plates 70, 72. Lateral basket sections 78 are generally defined between each pair of adjacent support plates 70, 72, 74, with each basket section 78 being generally characterized by a hollow or substantially hollow interior area surrounded by the lateral portions of the bars 76 extending between the respective pair of adjacent support plates 70, 72, 74. As is generally understood, the end plates 70, 72 may be rotatably coupled to the corresponding basket hanger 64 (which, in turn, is coupled to the associated bracket support arm(s) 62) via bearings to allow the basket assembly 54 to rotate relative to the hanger/arm 64, 62 as implement 10 is being moved across the field. Additionally, in the illustrated embodiment, the bars 76 of each basket assembly 54 are configured as formed bars. However, in other embodiments, the bars 76 may have any other suitable configuration, such as flat bars, round bars, and/or the like.

Moreover, in accordance with aspects of the present subject matter, FIG. 3 also illustrates components of one embodiment of a system 100 for monitoring plugging of one or more basket assemblies of an agricultural implement. Specifically, in the illustrated embodiment, the system 100 is shown as being configured for use in identifying and monitoring a plugged condition(s) of the depicted basket assemblies 54. However, in other embodiments, the system 100 may be utilized to monitor plugging of basket assemblies having any other suitable configuration.

As shown in FIG. 3, the system 100 includes one or more range sensors 102 installed on the implement 10 at a location relative to each basket assembly 54 such that each range sensor(s) 102 is configured to provide data indicative of a plugged condition of the basket assembly 54. Specifically, in several embodiments, each range sensor 102 may be installed relative to an adjacent basket assembly 54 such that the range sensor 102 is configured to transmit detection signals towards the interior of the basket assembly 54 along a line of sight or line of detection 104 (FIGS. 4A, 4B, 5A, and 5B) of the range sensor 102 and subsequently receive return signals corresponding to the detection signals as reflected off a given surface aligned with the line of detection 104 at such point in time, such as an outer surface of the bars 76 or the surface(s) of field materials that have accumulated on and/or within the basket assembly. By analyzing the return signals via an associated controller 106 (FIG. 8) communicatively coupled to each range sensor 102, the controller 106 may be configured to identify the presence of material accumulation on or within the basket assembly.

For instance, the return signals received by each range sensor 102 may be indicative of the distance defined between the sensor 102 and the corresponding reflection surface. In this regard, as the basket assembly 54 is rotated relative to each range sensor 102, the deflection signals transmitted from such range sensor 102 at any given point in time will either be directed towards one of the bars 76 surrounding the interior of the basket assembly 54 or the open space defined between adjacent bars 76, depending on the rotational orientation of the basket assembly 54 relative to the range sensor 102 at such point in time. As a result, when the adjacent basket assembly 54 is in a normal, un-plugged state (e.g., the interior of the basket assembly 54 is not occupied by field materials), the profile of the distance-related data associated with the return signals received by each range sensor 102 will generally correspond to a periodic or wave-like profile characterized by the deflection signals alternating between being reflected off of the spaced apart bars 76 and being transmitted between adjacent bars 76 through the open interior of the basket assembly 54. However, as field materials accumulate within the interior of the basket assembly 54, the detection signals directed from each range sensor 102 towards the open areas defined between adjacent bars 76 will bounce or reflect off the accumulated materials, thereby altering the data trace or profile of the distance-related data associated with the return signals received by the range sensor 102. Similarly, as field materials accumulate around the outer perimeter of the basket assembly 54 (e.g. on the bars 76), the detection signals directed from each range sensor 102 will bounce or reflect off the accumulated materials as opposed to reflecting off the bars 76 or being transmitted into the interior of the basket assembly 54, thereby altering the data profile of the distance-related data associated with the return signals received by the range sensor 102. Accordingly, by recognizing variations in the data profile (particularly variations indicative of a reduction in the distance detected between the sensor 102 and an associated reflection surface), the controller 106 may infer or estimate that the basket assembly 54 is experiencing a plugged condition. Once a plugged condition is detected, an appropriate control action may then be executed, such as by notifying the operator of the plugged condition or by performing an automated control action.

In general, the range sensors 102 may correspond to any suitable distance sensors, proximity sensors, and/or the like that are configured to collect data indicative of a distance or range defined between such sensors 102 and a given object/surface. For instance, in one embodiment, each range sensor 102 may correspond to an optical distance sensor, such as a laser-based distance sensor. In another embodiment, each range sensor 102 may correspond to ultrasound-based distance sensor. Laser-based distance sensors and ultrasound-based distance sensors suitable for use within the disclosed system 100 are commercially available from various sources, including, for example, from Banner Engineering Corp. of Minneapolis, Minn. In other embodiments, each range sensor 102 may correspond to any other suitable distance or proximity sensor or sensing device, such as a radar-based distance sensor, an inductance-based distance sensor, a sonar-based distance sensor, magnetic-based distance sensor, a LIDAR sensor, and/or the like.

As shown in FIG. 3, the range sensors 102 are mounted to the basket hanger 64 supporting each basket assembly 54 relative to the implement frame 28 (e.g., via the associated basket support arm 62) in a manner such that each range sensor 102 has a downwardly oriented line of sight or line of detection 104 (FIGS. 4A, 4B, 5A, and 5B) directed towards the interior of the adjacent basket assembly 54. Specifically, in the illustrated embodiment, the range sensors 102 are spaced apart laterally across each basket hanger 64 such that at least one range sensor 102 has a downwardly oriented line of detection directed towards the interior of each lateral basket section 78 of the adjacent basket assembly 54. As a result, the range sensors 102 may allow the plugging state of each respective basket section 78 to be individually monitored. However, in other embodiments, the range sensors 102 may be mounted at any other suitable location relative to the basket assembly 54 that allows each range sensor 102 to have a line of detection directed towards the interior of an associated basket assembly 54. Additionally, although the illustrated embodiment shows a specific number of range sensors 102 installed relative to each basket assembly 54 (e.g., one per each lateral basket section 78), the system 100 may generally include any suitable number of range sensors 102, including a single range sensor 102 for each basket assembly 54.

Figure 4A:
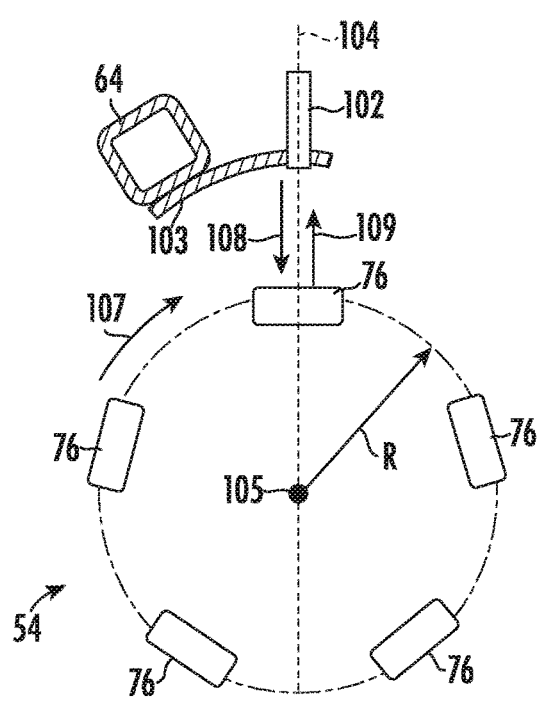
FIGS. 4A and 4B illustrate a schematic, simplified cross-sectional views of one of the basket assemblies shown in FIG. 3 when such basket assembly is a non-plugged state, particularly illustrating a range sensor of the disclosed system installed relative to the basket assembly for detecting material accumulation on or within the basket assembly in accordance with aspects of the present subject matter.
Figure 4B:
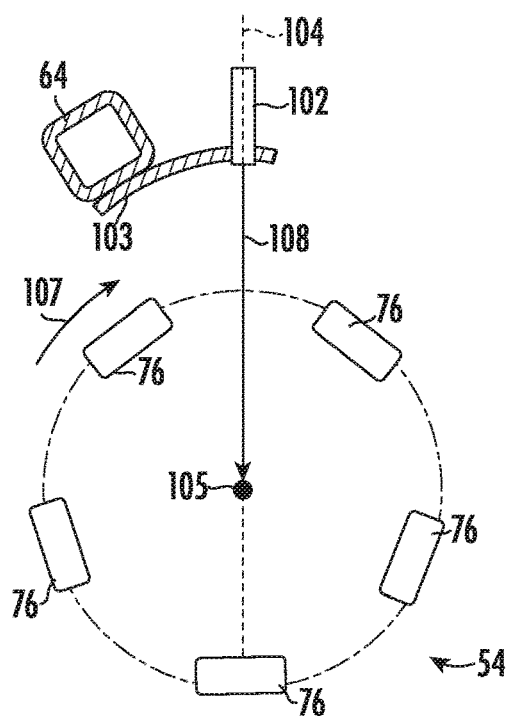
Figure 5A:
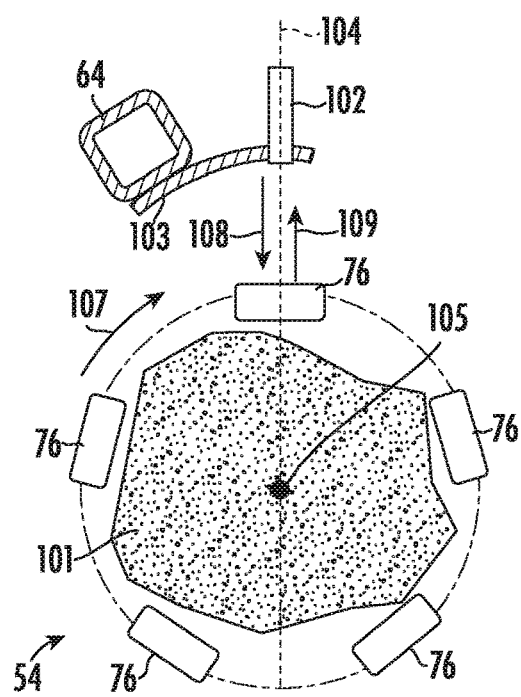
FIGS. 5A and 5B illustrate similar schematic, simplified cross-sectional view of the basket assembly shown in FIGS. 4A and 4B, but with the basket assembly now in a fully plugged state, particularly illustrating the range sensor being used to detect material accumulation within the basket assembly in accordance with aspects of the present subject matter.
Figure 5B:
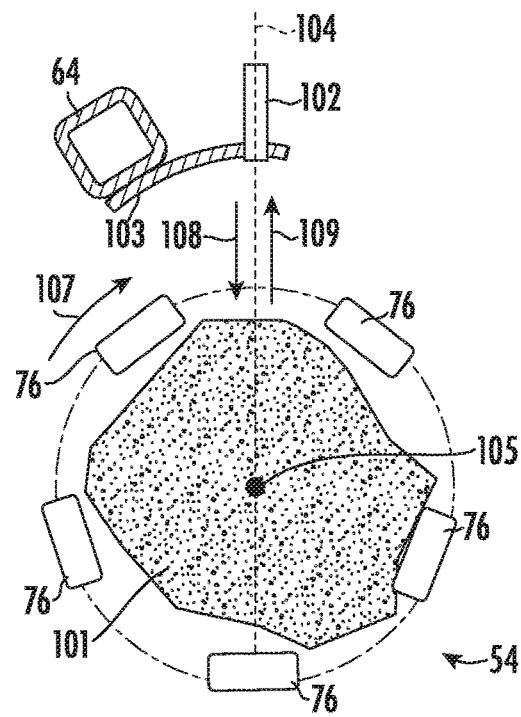

Referring now to FIGS. 4A and 4B and FIGS. 5A and 5B, schematic, simplified cross-sectional views of one of the basket assemblies 54 shown in FIG. 3 are illustrated in accordance with aspects of the present subject matter. Specifically, FIGS. 4A and 4B illustrate the basket assembly 54 in a non-plugged state such that the basket interior and exterior is completely devoid of material accumulation. Additionally, FIGS. 5A and 5B illustrates the basket assembly 54 when it is experiencing an internal plugged condition such that the basket interior includes field materials (indicated by mass 101) accumulated therein. For purposes of illustration, the basket assembly 54 of FIGS. 5A and 5B is shown in an almost fully plugged state. However, those of ordinary skill in the art will appreciate that basket assemblies 54 can experience varying degrees of plugged conditions, such as ranging from a partially plugged condition to a fully plugged condition.

As shown in FIGS. 4A, 4B, 5A, and 5B, the range sensor 102 is coupled to the adjacent basket hanger 64 (e.g., via a mounting bracket 103) such that the sensor 102 has a line of detection 104 oriented towards the interior of the basket assembly 54. Specifically, in the illustrated embodiment, the line of detection 104 of the sensor 102 is directed towards a center 105 of the basket assembly 54, which may also correspond to the location of the rotational axis of the basket assembly 54. However, in other embodiments, the line of detection 104 of the range sensor 102 may be directed towards any other location(s) within the interior of the basket assembly 54, such as any off-center location.

As particularly shown in FIGS. 4A and 4B, as the non-plugged basket assembly 54 rotates in a given rotational direction (e.g., as indicated by arrow 107) across the ground (and relative to the sensor 102) during the performance of an agricultural operation (e.g., a tillage operation), the line of detection 104 of the range sensors 102 alternates from being aligned with one of the bars 76 of the basket assembly 54 to being aligned with the open area or gap defined adjacent bars 76. For example, in the snapshot shown in FIG. 4A, the line of detection 104 is aligned with one of the bars 76 of the basket assembly 54. As a result, the detection signals (indicated by arrow 108) transmitted from the range sensor 102 may reflect off the outer surface of the aligned bar 76 and be directed back to the range sensor 102 as return signals (indicated by arrow 109). Such return signals 109 may then be analyzed, for example, to identify the distance between the sensor 102 and the aligned bar 76 (or, as will be described below, to identify distance between the aligned bar 76 and the basket center 105 via a linear transformation). In contrast, in the subsequent snapshot shown in FIG. 4B in which the basket assembly 54 has rotated slightly in the rotational direction 107 from the position shown in FIG. 4A, the line of detection 104 is aligned with the open space defined between adjacent bars 76 of the basket assembly 54. As a result, the detection signals 108 transmitted from the range sensor 102 may pass between the adjacent bars 76 and through the open interior of the basket assembly 54 to the basket center 105 or beyond. As the basket assembly 54 is further rotated in the rotational direction 107 from the position shown in FIG. 4B, the next adjacent bar 76 will pass through the line of detection 104 of the range sensor 102, thereby allowing the sensor 102 to detect the bar. Such alternating pattern will be repeated as the basket assembly 54 rotates relative to the range sensor 102 during operation of the agricultural implement.

It should be appreciated that, in the illustrated embodiment, the detection range of the range sensor 102 has generally been selected to generally correspond to the distance defined between the sensor 102 and the basket center 105. As a result, when the basket assembly 54 is in a non-plugged state, the range sensor 102 will not receive return signals when the line of detection 104 for the range sensor 102 is aligned with the open space between adjacent bars 76 (e.g., as shown in FIG. 4B), thereby indicating that the detection signals 108 reached the center 105 of the basket assembly 54. In other embodiments, the range sensor 102 may have any other suitable detection range. For instance, in another embodiment, the detection range may be selected to correspond to the distance defined between the sensor 102 and the ground (or the opposed side of the basket assembly 54 contacting the ground). In such an embodiment, when the line of detection 104 for the range sensor 102 is aligned with the open space between adjacent bars 76 (e.g., as shown in FIG. 4B), the detection signals 108 may be transmitted through the interior of the basket assembly 54 and reflect off the opposed side of the basket assembly 54 (e.g., a bar positioned at such opposed side) or the ground and be returned back to the sensor 102 as suitable return signals.

When the basket assembly 54 is experiencing a plugged condition, the same alternating pattern will be repeated as the basket assembly 54 rotates relative to the range sensor 102 during operation of the agricultural implement, with the line of detection 104 alternating between being aligned with one of the bars 76 of the basket assembly 54 and being aligned with the open space defined between adjacent bars 76. For instance, the line of detection 104 of the range sensor 102 is aligned with one of the bars 76 of the basket assembly 54 in the snapshot shown in FIG. 5A, while the line of detection 104 is aligned with the open space defined between adjacent bars 76 in the snapshot shown in FIG. 5B. However, unlike the non-plugged state described above with reference to FIGS. 4A and 4B, the detection signals 108 transmitted from the range sensor 102 will not pass through the interior of the basket assembly 54 to its center 105 when the line of detection 104 is aligned with the open space defined between adjacent bars 76 due to the presence of material accumulation within the interior of the basket assembly 54. Specifically, as shown in FIG. 5B, the detection signals 108 transmitted from the range sensor 102 reflect off the outer surface(s) of the accumulated material 101 and are directed back to the range sensor 102 as return signals 109. Such return signals 109 may then be analyzed, for example, to identify the distance between the sensor 102 and the accumulated materials 101 (or, as will be described below, to identify distance between the accumulated materials 101 and the basket center 105 via a linear transformation). When such material accumulation is detected, it may be inferred or determined that the basket assembly 54 is experiencing a plugged condition.

It should be appreciated that, although not shown, the basket assembly 54 may also experience an external plugging condition in which field materials accumulate along the outer perimeter of the basket assembly 54, such as on or between the bars 76. In such instance, the range sensor 102 may detect the material accumulation in a manner similar to that described. For instance, material accumulation on the bars 76 will result in a reduction in the distance detected between the sensor and the expected location of the bars 76. Similarly, material accumulation directly between the bars 76 will prevent the detection signals 108 from being transmitted through the interior of the basket assembly 54, which may be detected by the range sensor 102 via the associated return signals 109 reflecting off the accumulated materials.

Referring now to FIGS. 6 and 7, exemplary charts are provided that illustrate example data traces or profiles associated with the sensor data provided by the range sensor 102 in the non-plugged/plugged scenarios described above with reference to FIGS. 4A and 4B and FIGS. 5A and 5B, Specifically, FIG. 6 illustrates an exemplary data profile associated with the return signals 109 received by the range sensor 102 (or lack thereof) while the basket assembly 54 is in the non-plugged state shown in FIGS. 4A and 4B. Similarly, FIG. 7 illustrates an exemplary data profile associated with the return signals 109 received by the range sensor 102 while the basket assembly 54 is in the plugged state shown in FIGS. 5A and 5B. It should be appreciated that the data collected from the range sensor 102 is generally indicative of the distance defined between the sensor 102 and the detected surface(s). However, for purposes of illustration, the sensor data has been plotted as a function of the distance of the detected surface from the center 105 of the basket assembly 54. Such center-referenced data may be obtained via a linear transformation. In doing so, any sensor measurements that extend beyond the center 105 of the basket assembly 54 (e.g., when the detection range of the range sensor 102 extends past the basket center 105) may be saturated prior to performing the linear transformation.

As particularly shown in FIG. 6, when the basket assembly 54 is a non-plugged state, the sensor data may exhibit a periodic or alternating profile as the line of detection 104 of the range sensor 102 alternates between being aligned with one of the bars 76 and being aligned with the open spaces defined between adjacent bars 76. Specifically, the data trace is characterized by a repeating pattern of peaks 180 and valleys 182, with each peak 180 corresponding to the time period across which one of the bars 76 of the basket assembly 54 is being rotated across the line of detection 104 of the sensor 102 and each valley 182 corresponding to the time period across which the detection signals 108 from the range sensor 102 are being transmitted between adjacent bars 76 through the interior of the basket assembly 54 to at least the basket center 105. As shown in FIG. 6, each peak 180 corresponds to a distance from the basket center 108 equal to an outer radius R (see FIG. 4A) of the basket assembly 54 (i.e., the distance from the basket center 105 to the outer surfaces of the bars 76), while each valley 182 corresponds to a distance from the basket center 105 equal to zero. As such, the non-plugged data trace or profile for the basket assembly 54 generally exhibits a periodic profile with a very high variation or differential in the detected distances between the peaks 180 and valleys 182.

In contrast, as shown in FIG. 7, the data trace or profile associated with the sensor data received from the range sensor 102 differs significantly when the basket assembly 54 is experiencing a plugged condition. Specifically, due to the detection of material accumulation, the variability in the detected distances is reduced significantly. For instance, in the illustrated example, the data trace is characterized a similar repeating pattern of peaks 180 and valleys 184 as that described above with reference to FIG. 6, with each peak 180 corresponding to the time period across which one of the bars 76 of the basket assembly 54 is being rotated across the line of detection 104 of the sensor 102. However, in the exemplary plot of FIG. 7, each valley 184 corresponds to the time period across which the detection signals from the range sensor 102 are being transmitted between adjacent bars 76 and being reflected off the accumulated field materials. As shown in FIG. 7, given the plugged state of the basket assembly 54, the variation between the detected distance from the basket center 105 to the outer surfaces of the bars 76 and the detected distances from the basket center 105 to the outer surface(s) of the accumulated materials is significantly smaller than the distance variations described above with reference to FIG. 6. Such a reduced differential between the maximum and minimum distance values detected during rotation of the basket assembly 54 provides a significant indicator of material accumulation relative to the basket assembly.

Figure 8:
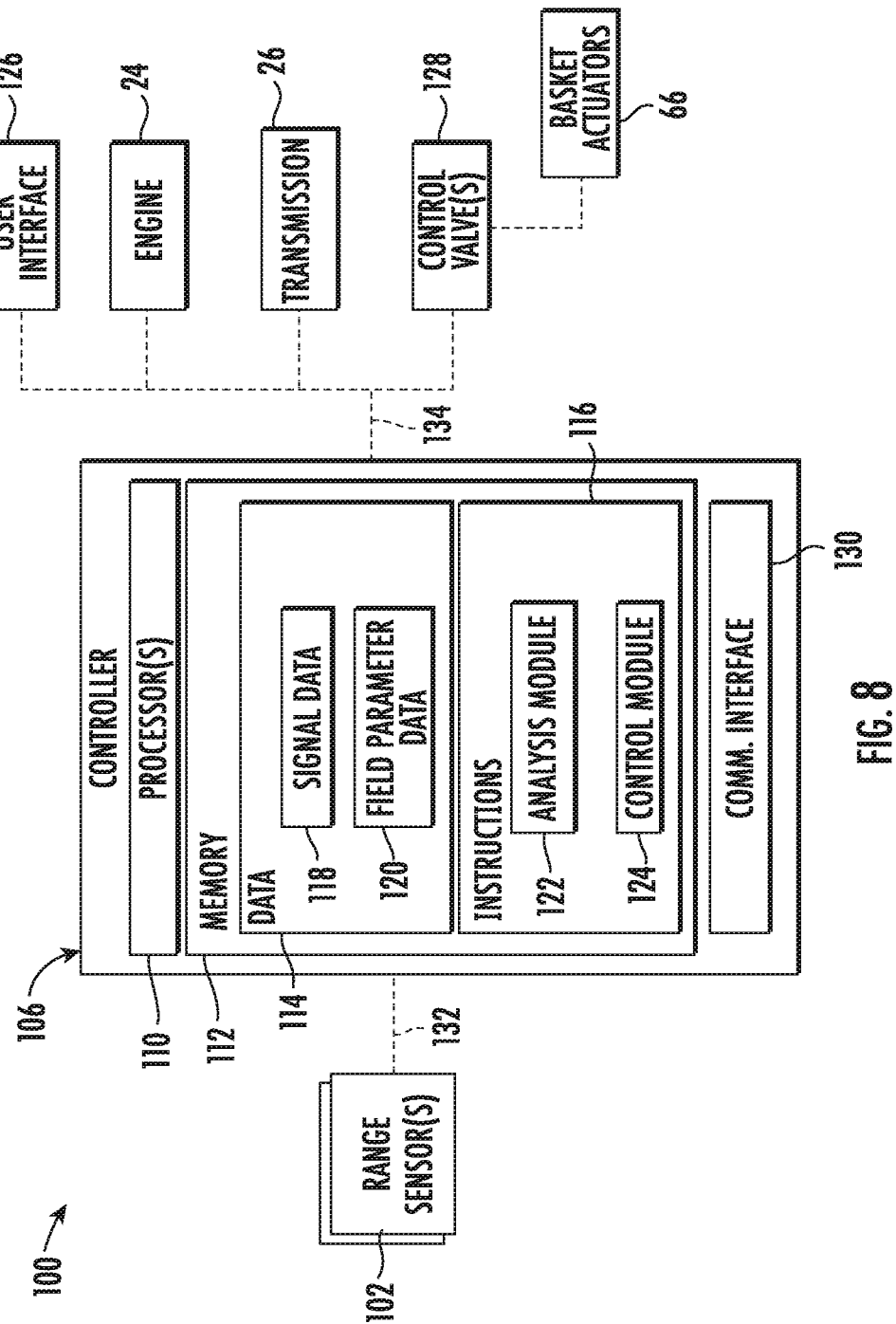
FIG. 8 illustrates a schematic view of one embodiment of a system for monitoring plugging of a basket assembly of an agricultural implement in accordance with aspects of the present subject matter.

Referring now to FIG. 8, a schematic view of one embodiment of a system 100 for monitoring plugging of one or more basket assemblies of an agricultural implement is illustrated in accordance with aspects of the present subject matter. In general, the system 100 will be described with reference to the implement 10 shown in FIGS. 1 and 2 and the basket assembly 54 and associated system components shown in FIG. 3. However, in other embodiments, the disclosed system 100 may be utilized to identifying tool plugging in association with any other suitable agricultural implement having any other suitable implement configuration, any other suitable basket assembly having any other suitable basket configuration, and/or using system components having any other suitable component configuration(s).

As indicated above, in several embodiments, the system 100 may include one or more range sensors 102 installed relative to a basket assembly 54 such that each range sensor(s) 102 is configured to provide data indicative of a plugged condition of the basket assembly 54. Additionally, as indicated above, the system 100 may also include a controller 106 communicatively coupled to the range sensor (s) 102. As will be described in greater detail below, the controller 106 may be configured to analyze the return signals received by the range sensor(s) 102 (or the lack thereof) and/or related data associated with such signals to infer or estimate the existence of material accumulation on and/or within the associated basket assembly 54. Additionally, the controller 106 may also be configured to execute one or more control actions in response to the determination that the basket assembly 54 is likely plugged or in the process of becoming plugged. For instance, in one embodiment, the controller 106 may notify the operator that the basket assembly 54 is plugged or is likely to become plugged in the near future. In addition to notifying the operator (or as an alternative thereto), the controller 106 may be configured to execute one or more automated control actions adapted to de-plug the basket assembly 54 or otherwise reduce the amount of material accumulation on and/or within the basket assembly 54, such as by automatically adjusting the speed of the implement 10 and/or the down force applied to the basket assembly 54 and/or by automatically raising and lowering the basket assembly 54 relative to the around.

In general, the controller 106 may correspond to any suitable processor-based device(s), such as a computing device or any combination of computing devices. Thus, as shown in FIG. 8, the controller 106 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory elements) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a signal database 118 for storing the return signals received by the range sensor(s) 102 and/or data associated with the received signals. For instance, in addition to the return signals received by the range sensor(s) 102, data may be stored within the signal database 118 associated with the distance defined between the sensor(s) 102 and the detected surface. Moreover, when desired, the signal database 118 may also be used to store any modified or transformed sensor data, such as when it is desired to transform the distance data from being referenced relative to the sensor location to being referenced relative to the center 105 of the basket assembly 54 or any other suitable reference location.

Additionally, as shown in FIG. 8, the memory 112 may include a field parameter database 120 for storing information related to one or more parameters of the field being processed during the performance of the associated agricultural operation (e.g., a tillage operation). In one embodiment, moisture data associated with the moisture content or level of the soil within the field may be stored within the field parameter database 120. Depending on the sensor technology being utilized, the wetness or moisture content of the soil may impact the ability of the range sensor(s) 102 of detecting plugged conditions. For instance, material accumulation including significantly high soil moisture may alter the manner in which the detection signals reflect off the accumulated field materials, which may negatively impact the resulting return signals received by the range sensor(s) 102. Accordingly, by knowing the soil moisture within the field, the controller 106 may be configured to more accurately assess the return signals received by the range sensor (s) 102.

It should be appreciated that the moisture data may be correspond to pre-existing or predetermined moisture data stored within the field parameter database 120 or the moisture data may correspond to sensor data that is being actively collected or generated during the performance of the associated agricultural operation. For instance, in one embodiment, the controller 106 may be provided with soil moisture data (e.g., in the form of a soil moisture map) that was collected during a previous agricultural operation or that was generated based on previously known data associated with the field conditions. Alternatively, a soil moisture sensor may be provided in operative association with the implement 10 or the towing vehicle 12 to allow the soil moisture to be actively monitored during the performance of the associated agricultural operation.

Referring still to FIG. 8, in several embodiments, the instructions 116 stored within the memory 112 of the controller 106 may be executed by the processor(s) 110 to implement an analysis module 122. In general, the analysis module 122 may be configured to analyze the return signals received by each range sensor(s) 102 (or a lack thereof) and/or the related data (e.g., distance data) to estimate or infer when the associated basket assembly 54 is experiencing a plugged condition. Specifically, in several embodiments, the analysis module 122 may be configured to determine when the basket assembly 54 is experiencing a plugged condition by analyzing the data trace or profile of the data associated with the return signals received by each range sensor(s) 102.

In one embodiment, the analysis module 122 may be configured to compare or analyze the current data trace or profile associated with the sensor data in view of a predetermined, non-plugged data trace or profile, such as the non-plugged data profile described above with reference to FIG. 6. In such an embodiment, the analysis module 122 may, for example, compare the variability or differential in the distance data detected within the current data profile to the variability or differential of the distance data associated with the non-plugged data profile. If a significant variation exists between the current data profile and the non-plugged data profile (e.g., a variation indicating that the distance variability or differential in the current data profile is significantly reduced relative to the distance variability or differential in the non-plugged data profile), the analysis module 122 may estimate or infer that the associated basket assembly is experiencing a plugged condition.

In another embodiment, the analysis module 122 may be configured to analyze the distance data associated with the return signals received by each range sensor(s) 102 (or a lack thereof) by calculating a detection range metric for the associated range sensor 102. In general, the detection range metric may be indicative of a percentage of the detection signals transmitted from a given range sensor 102 that reach a given location within the interior of the basket assembly 54 (or that reach to within a given range of locations defined relative to such location within the interior of the basket assembly 54). The analysis module 122 may then be configured to determine when the basket assembly 54 is experiencing a plugged condition based at least in part on the detection range metric. For instance, the analysis module 122 may be configured to compare the calculated detection range metric to a predetermined threshold. In such an embodiment, it may be inferred or estimated that the basket assembly 54 is experiencing a plugged condition when the detection range metric crosses such predetermined threshold (e.g., by falling below the threshold).

In a particular embodiment of the present subject matter, the detection range metric may be indicative of a percentage of the detection signals transmitted from a given range sensor 102 that reach the center 105 of the basket assembly 54 (or at least within a given radius of the center 105 of the basket assembly 54). For instance, the analysis module 122 may be configured to calculate a proximity center crossing (PCC) metric indicative of the percentage of detection signals that reach within a given radius defined from the basket center 105 (e.g., a radius of less than 10 centimeters (cm), such as a radius of less than 7.5 cm or less than 5 cm or less than 2.5 cm) across a given time period (e.g., a time period of 1 second, 2 seconds, 3 seconds, and/or the like). In one embodiment, the PCC metric may be calculated using the following formula (Equation 1):

$$PCC = \frac{(P_1 + P_2 \ldots + P_n)}{n} * 100 \qquad (1)$$

wherein, PCC corresponds to the percentage of the detection signals transmitted from the range sensor 102 that reach within a given radius defined from the basket center 105 over a given sampling period, n corresponds to the number of samples collected by the range sensor 105 over the sampling period given the sensor's sampling rate, and P corresponds to an intermediate variable that is assigned a value of one (1) if the detection signal transmitted at such instance reaches to within the predetermined radius defined from the basket center 105 and is assigned a value of zero (0) if the detection signal transmitted at such instance does not reach a location within such predetermined radius (e.g., due to the signal being reflected off the basket bars 76 or accumulated material).

By utilizing the above-described metric, a higher PCC percentage value indicates that a significant amount of the detection signals transmitted by the range sensor 102 are able to reach down to a location at or adjacent to the basket center 105, thereby indicating that the basket assembly 54 is likely in an non-plugged state. In contrast, a lower PCC percentage value indicates that a smaller amount of the detection signals transmitted by the range sensor 102 were able to reach down to a location at or adjacent to the basket center, thereby indicating that the basket assembly 54 is likely experiencing a plugged condition. In one embodiment, to assess the current PCC percentage value calculated for a given range sensor 102, such value may be compared to a predetermined PCC threshold. For instance, the PCC threshold may be set to a given percentage value, such as a percentage ranging from about 70% to about 10%, or from about 60% to about 20%, or from about 50% to about 30%, or from about 45% to about 35%, and/or any other subranges therebetween. In such an embodiment, when the current PCC percentage value calculated for a given range sensor 203 crosses or drops below the predetermined PPC threshold, it may be inferred or estimated that the basket assembly 54 is experiencing a plugged condition at the location along the basket assembly 54 at which the range sensor 102 is directed. For instance, if the PCC threshold is set as 40%, any PCC percentage value below such threshold indicates that less than 40% of the detection signals transmitted from the associated range sensor 102 are currently reaching a location within the predetermined radius defined from the basket center 105.

As indicated above, in one embodiment, the system 100 may include a plurality of range sensors 102, with at least one range sensor 102 being aligned with each lateral basket section 78 of a given basket assembly 54 to allow material accumulation to be detected on a section-level basis for the basket assembly 54. In such an embodiment, the analysis module 122 may be configured to individually analyze the return signals and/or associated signal data received by each range sensor 102 to determine whether a plugged condition exists within the localized area being detected by each range sensor 102.

Referring still to FIG. 8, the instructions 116 stored within the memory 112 of the controller 106 may also be executed by the processor(s) 110 to implement a control module 124. In general, the control module 124 may be configured to initiate a control action when it is determined that a basket assembly of an agricultural implement is experiencing a plugged condition. As indicated above, in one embodiment, the control module 124 may be configured to provide a notification to the operator of the vehicle/implement 12/10 indicating that material accumulation is present on or within one or more of the basket assemblies 54 of the implement 10. For instance, in one embodiment, the control module 124 may cause a visual or audible notification or indicator to be presented to the operator via an associated user interface 126 provided within the cab 22 of the vehicle 10.

In other embodiments, the control module 124 may be configured to execute an automated control action designed to adjust the operation of the implement 10. For instance, in one embodiment, the controller 106 may be configured to increase or decrease the operational or ground speed of the implement 10 in an attempt to reduce the amount of material accumulation and/or to limit further material accumulation. For instance, as shown in FIG. 8, the controller 106 may be communicatively coupled to both the engine 24 and the transmission 26 of the work vehicle 12. In such an embodiment, the controller 106 may be configured to adjust the operation of the engine 24 and/or the transmission 26 in a manner that increases or decreases the ground speed of the work vehicle 12 and, thus, the ground speed of the implement 10, such as by transmitting suitable control signals for controlling an engine or speed governor (not shown) associated with the engine 24 and/or transmitting suitable control signals for controlling the engagement/disengagement of one or more clutches (not shown) provided in operative association with the transmission 26. It should be appreciated that controller 106 may also be configured to decrease the ground speed in a manner that brings vehicle/implement 12/10 to a complete stop.

In addition to the adjusting the ground speed of the vehicle/implement 12, 10 (or as an alternative thereto), the controller 106 may also be configured to adjust an operating parameter associated with the ground-engaging tools of the implement 10. For instance, as shown in FIG. 8, the controller 106 may be communicatively coupled to one or more valves 128 configured to regulate the supply of fluid (e.g., hydraulic fluid or air) to one or more corresponding actuators of the implement 10, such as the basket actuators 66. In such an embodiment, by regulating the supply of fluid to the actuator(s) 66, the controller 106 may automatically adjust the down force or down pressure applied to the associated basket assembly 54. Additionally, the controller 106 may control the operation of the basket actuator 66 to raise and lower the associated basket assembly 54 relative to the ground.

Moreover, as shown in FIG. 8, the controller 106 may also include a communications interface 130 to provide a means for the controller 106 to communicate with any of the various other system components described herein. For instance, one or more communicative links or interfaces 132 (e.g., one or more data buses) may be provided between the communications interface 130 and the range sensor(s) 102 to allow the signals received by the range sensor(s) 102 (and/or related signal data) to be transmitted to the controller 106. Similarly, one or more communicative links or interfaces 134 (e.g., one or more data buses) may be provided between the communications interface 134 and the engine 24, the transmission 26, the user interface 126, the control valves 128, and/or the like to allow the controller 106 to control the operation of and/or otherwise communicate with such system components.

Figure 9:
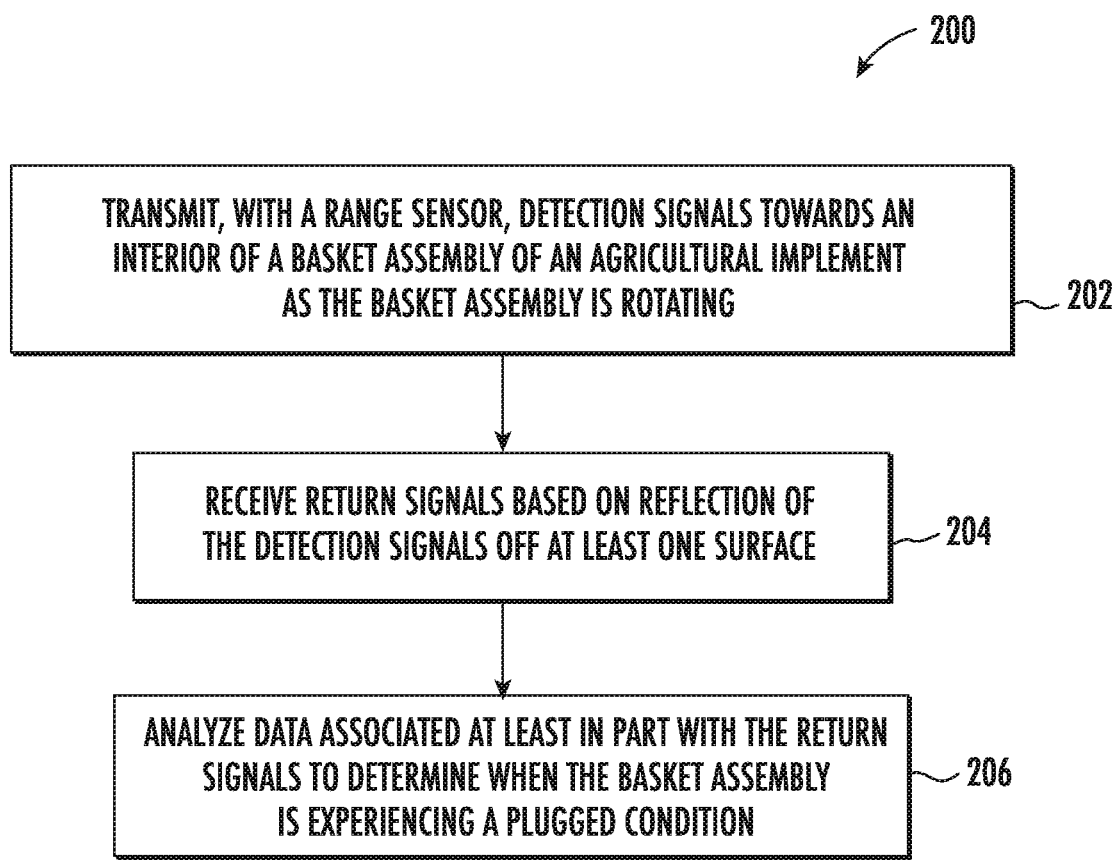
FIG. 9 illustrates a flow diagram of one embodiment of a method for monitoring plugging of a basket assembly of an agricultural implement in accordance with aspects of the present subject matter.

Referring now to FIG. 9, a flow diagram of one embodiment of a method 200 for monitoring plugging of basket assemblies of an agricultural implement is illustrated in accordance with aspects of the present subject matter. In general, the method 200 will be described herein with reference to the agricultural implement 10, the basket assembly 54, and the system 100 described above with reference to FIGS. 1-3 and 8. However, it should be appreciated by those of ordinary skill in the art that the disclosed method 200 may generally be implemented with any agricultural implement having any suitable implement configuration, any basket assembly having any suitable basket configuration, and/or any system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (202), the method 200 may include transmitting, with a range sensor, detection signals towards an interior of a basket assembly of an agricultural implement as the basket assembly is rotating. For example, as indicated above, one or more range sensors 102 may be installed relative to a basket assembly 54 of an agricultural implement 10, with each range sensor 102 being configured to transmit detection signals along a line of detection 104 towards the interior of the basket assembly 54.

Additionally, at (204), the method 200 may include receiving return signals based on reflection of the detection signals off at least one surface. Specifically, as indicated above, the detection signals transmitted from each range sensor 102 may reflect off a given surface (e.g., the outer surface of the bars 76 of the associated basket assembly 54 and/or the surface(s) of the accumulated field materials) and be subsequently detected as return signals by the range sensor.

Moreover, as shown in FIG. 9, at (206), the method 200 may include analyzing data associated at least in part with the return signals to determine when the basket assembly is experiencing a plugged condition. For instance, as indicated above, the controller 106 may be configured to infer or estimate that a basket assembly 54 is experiencing a plugged condition by identifying variations in a data profile or trace associated with the data received from each range sensor and/or by comparing a calculated metric (e.g., a detection range metric, such as the PCC metric described above) to a predetermined threshold.

It is to be understood that the steps of the method 200 are performed by the controller 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 106 described herein, such as the method 200, is implemented in software code or instructions which are tangibly stored on a tangible computer readable medium. The controller 106 loads the software code or instructions via a direct interface with the computer readable medium or via a wired and/or wireless network. Upon loading and executing such software code or instructions by the controller 106, the controller 106 may perform any of the functionality of the controller 106 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring basket plugging for agricultural implements, the system comprising:
   a basket assembly configured to be supported by an agricultural implement;
   a range sensor positioned relative to the basket assembly such that the range sensor is configured to transmit detection signals towards an interior of the basket assembly and receive return signals based on reflection of the detection signals off at least one surface; and
   a controller communicatively coupled to the range sensor, the controller configured to analyze data received from the range sensor as the basket assembly rotates relative to the range sensor to determine when the basket assembly is experiencing a plugged condition.

2. The system of claim 1, wherein the controller is configured to calculate a detection range metric indicative of a percentage of the detection signals that reach at least one of a given location within the interior of the basket assembly or a range of locations defined relative to the given location within the interior of the basket assembly, the controller being configured to determine when the basket assembly is experiencing the plugged condition based at least in part on the detection range metric.

3. The system of claim 2, wherein the controller is configured to compare the calculated detection range metric to a predetermined threshold, the controller being configured to determine that the basket assembly is experiencing the plugged condition when the detection range metric crosses the predetermined threshold.

4. The system of claim 2, wherein the given location comprises a center of the basket assembly.

5. The system of claim 1, wherein the controller is configured to determine when the basket assembly is experiencing the plugged condition by identifying variations in a profile of the data received from the range sensor as the basket assembly is being rotated.

6. The system of claim 5, wherein the basket assembly comprises a plurality of spaced apart bars surrounding the interior of the basket, each of the plurality of spaced apart bars passing through a line of detection along which the detection signals are transmitted towards the interior of the basket assembly as the basket assembly is being rotated.

7. The system of claim 6, wherein the controller is configured to compare the profile of the data to a non-plugged data profile, the non-plugged data profile comprising a periodic profile characterized by the deflection signals alternating between reflecting off of the plurality of spaced apart bars and being transmitted between adjacent bars of the plurality of spaced apart bars into the interior of the basket assembly.

8. The system of claim 1, wherein the basket assembly comprises a plurality of lateral basket sections, with each lateral basket section being defined between adjacent support plates of the basket assembly, and wherein the range sensor comprises one of a plurality of range sensors installed relative to the basket assembly, the plurality of range sensors being positioned relative to the basket assembly such that at least one range sensor of the plurality of range sensors is configured to transmit detection signals towards a portion of the interior of the basket assembly defined by a respective lateral basket section of the plurality of lateral basket sections.

9. The system of claim 8, wherein the controller is further configured to determine when a given lateral basket section of the plurality of lateral basket sections is experiencing a plugged condition by analyzing the data received from the at least one range sensor transmitting detection signals towards the portion of the interior of the basket assembly defined by such lateral basket section.

10. The system of claim 1, wherein the range sensors comprises at least one of an optical range sensor or an ultrasonic-based range sensor.

11. An agricultural implement, comprising:
a frame;
a basket assembly configured to be supported by the frame;
a range sensor supported relative to the basket assembly such that the range sensor has a line of detection directed towards an interior of the basket assembly, the range sensor configured to generate data associated a distance between the range sensor and at least one surface aligned with the line of detection as the basket assembly is rotated relative to the range; and
a controller communicatively coupled to the range sensor, the controller configured to analyze the data received from the range sensor to determine when the basket assembly is experiencing a plugged condition.

12. A method for monitoring plugging of basket assemblies of agricultural implements, the method comprising:
transmitting, with a range sensor, detection signals towards an interior of a basket assembly of an agricultural implement as the basket assembly is rotating;
receiving return signals based on reflection of the detection signals off at least one surface; and
analyzing, with a computing device, data associated at least in part with the return signals to determine when the basket assembly is experiencing a plugged condition.

13. The method of claim 12, further comprising controlling an operation of the agricultural implement to adjust an operating parameter associated with the agricultural implement when it is identified that the basket assembly is experiencing the plugged condition.

14. The method of claim 12, further comprising notifying an operator of the agricultural implement when it is identified that the basket assembly is experiencing the plugged condition.

15. The method of claim 12, further comprising determining a detection range metric indicative of a percentage of the detection signals that reach at least one of a given location within the interior of the basket assembly or a range of locations defined relative to the given location within the interior of the basket assembly.

16. The method of claim 15, wherein analyzing the data received from the range sensor comprises comparing the detection range metric to a predetermined threshold to determine when the basket assembly is experiencing the plugged condition.

17. The method of claim 15, wherein the given location comprises a center of the basket assembly.

18. The method of claim 12, wherein analyzing the data received from the range sensor comprises identifying variations in a profile of the data received from the range sensor to determine when the basket assembly is experiencing the plugged condition.

19. The method of claim 18, wherein identifying variations in the profile of the data received from the range sensor comprises analyzing the profile of the data in view of a non-plugged data profile associated with operation of the basket assembly in a non-plugged state.

20. The method of claim 15, wherein the range sensors comprises at least one of an optical range sensor or an ultrasonic-based range sensor.

* * * * *